US010029387B2

(12) United States Patent
Brynildsen et al.

(10) Patent No.: US 10,029,387 B2
(45) Date of Patent: Jul. 24, 2018

(54) POLYMER IMPREGNATED BAMBOO

(75) Inventors: Per Brynildsen, Porsgrunn (NO); Stig Lande, Sarpsborg (NO)

(73) Assignee: KEBONY AS, Oslo (NO)

( * ) Notice: Subject to any disclaimer, the term of this patent is extended or adjusted under 35 U.S.C. 154(b) by 106 days.

(21) Appl. No.: 14/115,322

(22) PCT Filed: May 2, 2012

(86) PCT No.: PCT/EP2012/058049
§ 371 (c)(1),
(2), (4) Date: Jan. 27, 2014

(87) PCT Pub. No.: WO2015/150270
PCT Pub. Date: Nov. 8, 2012

(65) Prior Publication Data
US 2014/0154515 A1    Jun. 5, 2014

(30) Foreign Application Priority Data
May 3, 2011 (GB) .................................. 1107315.2
Jun. 15, 2011 (GB) .................................. 1110090.6

(51) Int. Cl.
B27K 3/34 (2006.01)
B27K 1/00 (2006.01)
B27K 3/02 (2006.01)
B27K 3/15 (2006.01)
B27K 5/00 (2006.01)
(Continued)

(52) U.S. Cl.
CPC .............. *B27K 3/343* (2013.01); *B27K 1/00* (2013.01); *B27K 3/0278* (2013.01); *B27K 3/156* (2013.01); *B27K 5/001* (2013.01); *B32B 9/02* (2013.01); *C08L 97/02* (2013.01); *C08L 71/14* (2013.01); *Y10T 428/31515* (2015.04); *Y10T 428/31591* (2015.04); *Y10T 428/31957* (2015.04); *Y10T 428/31971* (2015.04); *Y10T 428/4935* (2015.04)

(58) Field of Classification Search
None
See application file for complete search history.

(56) References Cited

U.S. PATENT DOCUMENTS 3,927,157 A * 12/1975 Vasterling .................. 423/447.4
4,528,117 A *  7/1985 Scholl et al. ................... 516/68
(Continued)

FOREIGN PATENT DOCUMENTS

CN          1671525 A      9/2005
CN        101380757 A      3/2009
(Continued)

OTHER PUBLICATIONS

Krzesinska et al, "Development of Monolithic Eco-Composites from Carbonized Blocks of Solid Iron Bamboo (Dendrocalamus Strictus) by Impregnation with Furfuryl Alcohol", "Bioresource Technology" 100 (2009), pages 1274-1278.
(Continued)

*Primary Examiner* — Chinessa T. Golden
(74) *Attorney, Agent, or Firm* — Donald E. Stout; Stout, Uxa & Buyan, LLP

(57) ABSTRACT

An engineering or constructional member comprising at least two strips bonded with an adhesive; each of the strips comprises bamboo impregnated or treated with a polymer derived from one or more furfuryl alcohol resin precursors.

12 Claims, 2 Drawing Sheets

Figure 1:
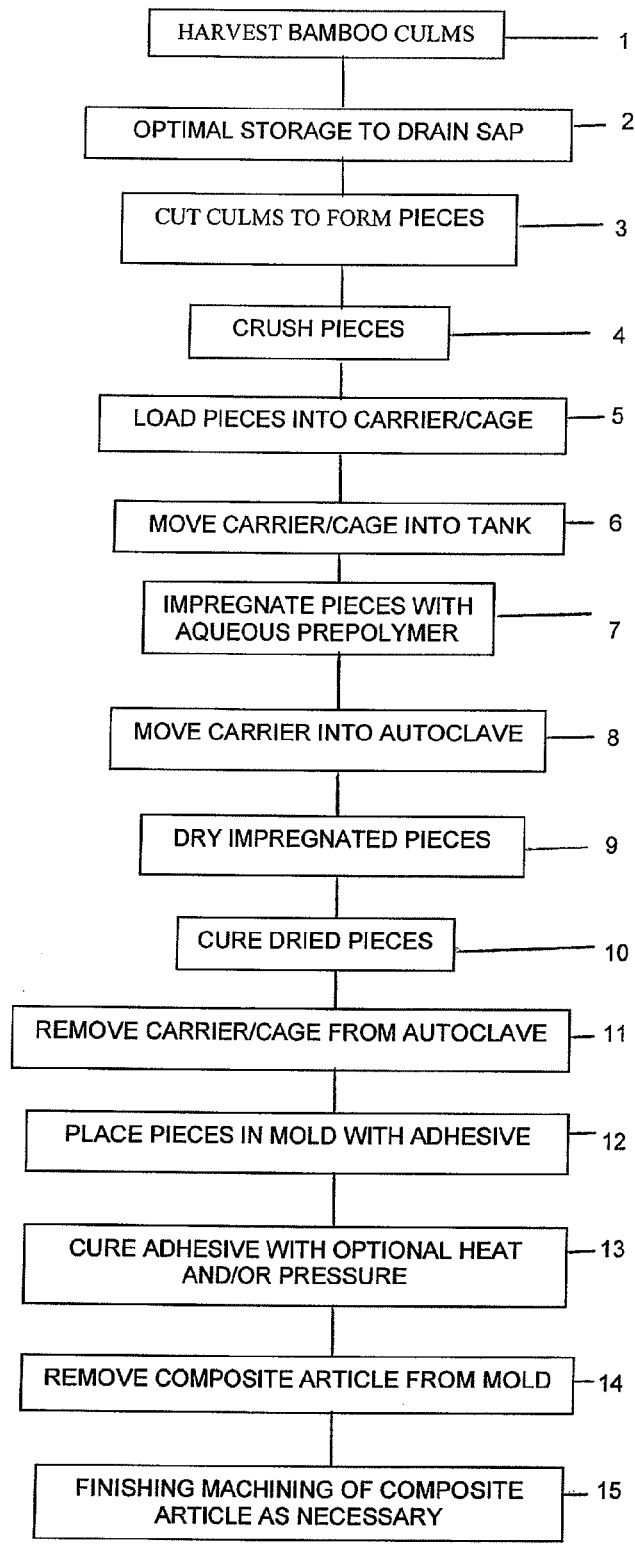

(51) Int. Cl.
  *B32B 9/02*  (2006.01)
  *C08L 97/02*  (2006.01)
  *C08L 71/14*  (2006.01)

(56) References Cited

U.S. PATENT DOCUMENTS

2005/0170165 A1\* 8/2005 Westin .................. B27K 3/15
                                                    428/292.4
2007/0031630 A1\* 2/2007 Chu et al. ...................... 428/54

FOREIGN PATENT DOCUMENTS

| CN | 101450493 A | 6/2009 |
|----|----|----|
| EP | 0606866 A1 | 7/1994 |
| WO | 2002030638 A2 | 4/2002 |
| WO | 2004011216 A2 | 2/2004 |
| WO | 2010116162 A | 10/2010 |
| WO | WO 2010116262 A1 | 10/2010 |

OTHER PUBLICATIONS

Office Action dated Apr. 21, 2015 issued by China Patent Office in corresponding Chinese patent application No. 201280030051.8.
International Search Report and Written Opinion, in corresponding International application No. PCT/EP2012/058049, International filing date May 2, 2012.

\* cited by examiner

POLYMER IMPREGNATED BAMBOO

This application claims priority to PCT International Application No. PCT/EP2012/058049, having an international filing date of May 2, 2012, and entitled Polymer Impregnated Bamboo, which in turn claims priority to Great Britain Application No. 1107315.2, filed on May 3, 2011, and to Great Britain Application No. 1110090.6, filed on Jun. 15, 2011. All of the foregoing applications are herein expressly incorporated by reference, in their entirety.

This invention relates to composites or composite articles comprising bamboo or bamboo articles impregnated or filled with a polymerisable composition particularly but not exclusively furfuryl alcohol, derivatives of furfuryl alcohol or oligomers of these compounds and subsequently polymerised.

Various processes have been used for polymer treatment of wood.

EP-A-1341648, WO-A-2007/147804, WO-A-2004/011216 and EP-A-1368167 disclose furan impregnated wood compositions.

Although there have been disclosures of processes for impregnation of wood, there has been no disclosure of use of furfuryl alcohol or related compounds for impregnation of non-wood substrates, particularly bamboo or articles made from bamboo.

Bamboo is an evergreen in the true grass family Poaceae. Species in the genus *Phyllostachys* are particularly suitable for commercial use. Culms or aerial stalks are widely used in construction and in manufacture of bamboo articles.

Bamboo used for construction purposes is usually harvested when sugar levels in the sap are at a minimum, in order to reduce the rate of pest infestation. Removal of sap after harvesting by leaching is carried out by storing the cut bamboo or by pumping water through the freshly cut culms. Bamboo intended for construction is treated with borax or boric acid to improve insect and rot resistance.

Harvesting and treatment of bamboo is made more difficult by the susceptibility to rot and insect attack. Furthermore the suitability of bamboos for external use is limited by the local environment and specific applications. In Europe or other temperate or cold climates, bamboo particularly discolours and degrades. Furthermore surfaces formed from bamboo can become slippery particularly if elongate culm sections are exposed. Therefore use for construction of walkways, decking or flooring may be undesirable. Bamboo used for engineering applications may be weakened by rot or insect damage adjacent to fastenings.

Exterior use of bamboo and bamboo articles has been limited because of the susceptibility of bamboo to biological degradation, particularly discolouring and degradation by micro-organisms, fungi or attack by insects, termites or other pests. Therefore there is a need for improving the resistance of bamboo to such degradation.

Furthermore the mechanical properties and appearance of untreated bamboo may be inconsistent or unsuitable for particular application, especially for engineering or constructional applications in which a consistently high performance is required.

According to a first aspect of the present invention there is provided polymer impregnated bamboo comprising bamboo impregnated or treated with a polymer derived from one or more polymerisable monomers or oligomers selected from the group consisting of furfuryl alcohol (FA), bishydroxymethyl furan (BHMF), trihydroxymethyl furan (THMF), oligomers of FA, BHMF and THMF condensation products of these compounds and mixtures thereof.

According to a second aspect of the present invention there is provided an engineering or constructional component comprising bamboo impregnated or treated with a polymer derived from one or more polymerisable monomers or oligomers selected from the group consisting of furfuryl alcohol (FA), bishydroxymethyl furan (BHMF), trihydroxymethyl furan (THMF), oligomers of FA, BHMF and THMF condensation products of these compounds and mixtures thereof.

The engineering or constructional members may comprise bamboo culms or strips or pieces of culms. Preferably the member comprises two or more culms, strips or pieces bonded together using an adhesive to form a composite engineering or constructional component, such as a board, decking, marine component, panel, cladding, sporting equipment or other moulded or formed article. The composite may comprise a laminar member in which the pieces of impregnated bamboo are bonded together by layers of adhesive.

A constructional member comprising bamboo composite in accordance with this invention confers several advantages. Impregnation or treatment of the culms or pieces reduces susceptibility to fungal or microbial degradation or to attack by insects, termites or other pests. The need for treatment with biocides such as borates may be avoided or reduced. Harvesting and processing of the cut down culms may be simplified as the need for reduction of the sap content or sugar concentration in the sap may be reduced or avoided.

The constructional member may exhibit one or more improved properties in comparison to untreated bamboo. The hardness and dimensional stability of the treated bamboo is increased. Flexural strength and resistance to delamination may be also increased. Furthermore, the colour of the treated bamboo may be improved. For example, a consistent dark brown colour may be obtained allowing production of boards or other components having a uniform appearance and consistent mechanical properties.

Maintaining the sugar content of the culms is beneficial in that the sugar may react with the impregnating monomer or oligomers to form a polymeric product which is integrally bound into the cell structure. Mechanical properties of the composite may be enhanced and consumption of the polymerisable impregnating materials may be reduced.

Constructional members comprising bamboo composites of the present invention may be used as engineering materials, for example as elongate constructional members such as joists, beams or scaffolding. Alternatively, the constructional members may be incorporated into further composite materials, for example strips of impregnated bamboo may be bonded together using adhesives and formed into boards, flooring tiles, window frames, panels or articles such as furniture for interior or exterior use. Marine components such as decking or sporting equipment such as surfboards and bicycle frames may be provided.

Preferred adhesives may be selected from the group consisting of: epoxy resins, urea-formaldehyde resins, melamine-formaldehyde resins, methylene diphenyl isocyanate or polyurethane resins or other moisture resistant adhesives.

The adhesive layers may contain one or more fillers to modify the properties of the constructional members. For example pigments or dyes may be added. Conductive fillers may be used, for example, carbon or metallic particles. Aggregates having a high degree of hardness may be used to improve wear resistance or non slip properties of the resultant composite members.

Boards or other laminar constructional components may be made by hot compression, cold compression or other techniques used for manufacture of wood composites. Impregnated strands or slats formed from bamboo culms or pieces may be pressed or moulded to form laminated or shaped articles for direct use or for machining to form more complex configurations.

Impregnated bamboo components of this invention provide advantageous mechanical properties in relation to untreated bamboo. Resilience, hardness and impact resistance may be improved whilst retaining the flexural strength of untreated bamboo.

Bamboo composite articles and composites incorporating the impregnated bamboo may exhibit enhanced non-slip properties, facilitating use in construction of walkways, or decking.

Furthermore, since microbiological degradation is reduced, formation of slippery surfaces is reduced or avoided. Security of fixings such as bolts, screws or other mechanical couplings may be improved.

A preferred process for forming polymer impregnated bamboo or an engineering or constructional member comprising bamboo and a polymeric material comprises the steps of:
  impregnating or treating the bamboo with a polymerisable composition comprising:
    (i) one or more furfuryl alcohol resin precursors;
    (ii) a catalyst;
    (iii) a solvent selected from the group consisting of: water, acetone, $C_1$-$C_4$ alcohols and mixtures thereof; and
    (iv) optionally one or more stabilisers or other ingredients to produce a resin impregnated or treated bamboo or a resin impregnated or treated bamboo article;
  subjecting the impregnated or treated bamboo or bamboo article to a water removal process; and
  maintaining the impregnated or treated bamboo or bamboo article at a higher temperature to cause polymerisation of the composition to form a polymeric material to produce a polymer impregnated or treated bamboo member.

The bamboo may be completely impregnated with the polymer or may be treated so that a surface layer or layers are impregnated with the polymer.

The furfuryl alcohol resin precursors may be selected from: polymerisable monomers, or oligomers selected from the group consisting of furfuryl alcohol (FA), bishydroxymethyl furan (BHMF), trihydroxymethyl furan (THMF), oligomers of FA, BHMF and THMF condensation products of these compounds and mixtures thereof.

Formaldehyde condensation products of the furan monomers or oligomers may be used.

Preferred monomers are derived from biomass or from renewable and sustainable resources and are capable of impregnating a bamboo or a bamboo article. A single monomer may be most convenient for simplicity and ease of uniform impregnation. Use of furfuryl alcohol or bishydroxymethyl furan is preferred.

Further monomers or oligomers may include 2,5-furan dicarboxylic acid and succinic acid.

Preferably the polymers, monomers and oligomers have a boiling point not less than 50° C. higher than the boiling point of the solvent at atmospheric pressure. This allows removal of the solvent, for example water, without volatisation of the impregnated compounds.

Polymerisation of the composition may be achieved by various processes. The methods disclosed in WO02/30638 or WO04/011216, the disclosures of which are incorporated herein for all purposes by reference, may be employed.

Steam heating followed by kiln drying may be employed. Alternatively, a combined drying and curing process may be carried out in a sealed vessel provided with means for collection of water and/or solvent removed from the impregnated bamboo. Solvents may be recycled for repeated use.

The impregnated bamboo may be heated to an elevated temperature of, for example, 50° C. to 180° C., preferably 100° C. to 130° C., over a period of several hours to remove water and/or solvent and then form the cured polymer. The heating may be raised at a predetermined rate to control water removal and curing under optimally efficient conditions.

Alternatively the impregnated bamboo may be dried using a vacuum drying process followed by heating to a higher temperature to cause polymerisation.

The preferred solvent is water, although methanol, ethanol, acetone or other volatile solvents may be employed.

One or more catalysts may be used the catalyst or catalysts may be selected from the group consisting of: acids or anhydrides, for example, maleic anhydride, phthalic anhydride, maleic acid, malic acid, phthalic acid, benzoic acid, citric acid, zinc chloride, aluminium chloride, other cyclic organic anhydrides or latent catalysts such as ammonium salts organic anhydrides and mixtures thereof.

The stabilisers which preferably act as buffers may be selected from the group consisting of: soluble carbonates, bicarbonates, citrates, phosphates and calcium or ammonium salts of lignosulphonic acids.

In a preferred process during the removal of water the relative humidity is maintained at about 80% to about 100%, more preferably at about 90%, for a period of 1 to 200 hours, usually 120 hours, followed by curing at a temperature preferably about 50° C. to about 180° C., more preferably about 90° C. to about 140° C., most preferably about 100° C. to about 130° C., especially about 120° C.

A heat exchanger or heat battery may be provided to allow direct heating of the atmosphere within the vessel. Further heating may be preferably provided by injecting superheated steam into the vessel. Superheated steam is preferred in order to cause drying of the bamboo.

The relative humidity may be determined by the difference between the actual pressure at a given temperature as a percentage of the saturation pressure of steam at that temperature. Relative humidity within the chamber generally decreases during the drying process as water is removed from the chamber.

Preferably the relative humidity is maintained above a minimum level during the heating up phase and at the end of the drying process in order to minimise deformation and cracking of the bamboo. The relative humidity by range from about 30% to about 100%. A preferred minimum relative humidity is about 35%, more preferably about 40%, dependent on the bamboo species and the dimension of the bamboo pieces or articles being processed.

The relative humidity within the container may be controlled by regulation of pressure and temperature.

Following the drying step the bamboo or bamboo articles are heated to a higher temperature to cure the polymer. It is beneficial to remove water from the bamboo or bamboo articles before curing. This allows more rapid curing since thermal energy is not lost by evaporation. A lower temperature may be used in comparison to a conventional process. Also heating of the bamboo to the curing temperature may be achieved in less time and with less energy due to the reduction of evaporative losses.

The drying and curing steps may be carried out in the same container, that is without a need for unloading from a drying oven and reloading into a separate curing oven.

According to a further aspect of the present invention apparatus for polymer impregnation of bamboo or a bamboo article comprises a container adapted to receive a quantity of bamboo or one or more bamboo articles to be treated, the container having a pump for applying reduced pressure to the container, a steam generator adapted to supply superheated steam to the chamber and sensors adapted to monitor parameters selected from pressure, temperature, humidity and concentration of volatile organic compounds within the container.

The apparatus may include a removable container for the bamboo, the container having apertures to permit flow of impregnating liquid. For example a stackable cage may be used. A trolley may be provided, comprising a cage mounted on a wheeled carriage.

An inlet for superheated steam may be provided.

A heat exchanger within the vessel may be provided for direct heating.

The process in accordance with this invention may be applied to whole bamboo culms, pieces thereof or shaped bamboo articles, for example roofing, poles, scaffolding or other partially or fully machined or worked components. The invention finds particular application in treatment of bamboo pieces for example slats or strands which are subsequently bonded using an adhesive to form floor boards, floor tiles, decking, cladding or marine components or articles such as surfboards.

In this specification percentages and other amounts are by weight unless indicated otherwise. Percentages and other proportions are selected from any ranges quoted to total 100%.

Figure 2:
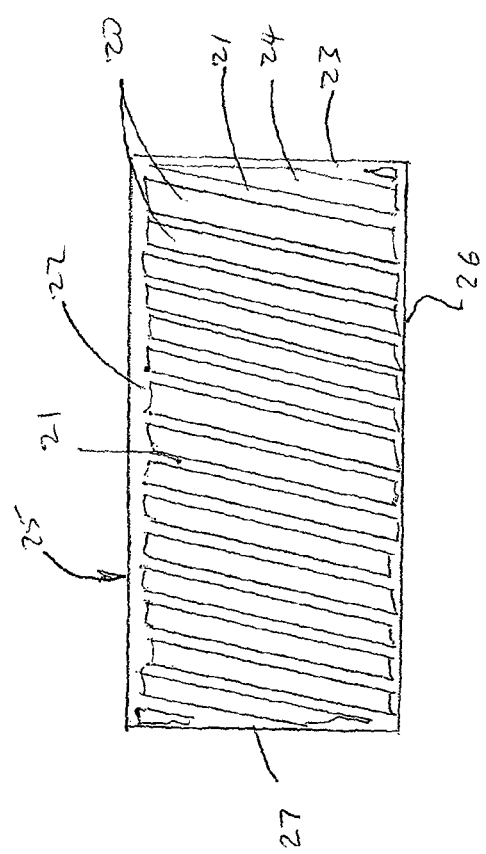

The invention is further described by means of example but not in any limitative sense with reference to the accompanying drawings of which:

FIG. 1 is a schematic flow chart showing the steps in manufacture of a composite article in accordance with the invention; and FIG. 2 is a cross sectional view of an engineering component in accordance with the invention.

The first stage of manufacture of the composite article is harvesting of the bamboo cones (1) followed by optional storage to allow drainage of sap (2) before the cones are cut into pieces (3) with a desired length suitable for impregnation. The cut pieces are crushed or further cut to form pieces with a desired size (4).

A supply of bamboo pieces or bamboo articles, for example split culms, is organised into a separated stack on a trolley or other carrier (5) using spacers so that each culm is separated from adjacent culms. The pieces may be placed in a cage to prevent movement or floating during impregnation. The stack is then moved on the carrier into an impregnation autoclave or tank (6).

The autoclave is filled with an impregnating solution from buffer tanks supplied from storage tanks via a mixing and measuring tank. The pieces are allowed to become impregnated with the solution (7).

After impregnation, the impregnated bamboo or bamboo articles are transferred to a drying chamber (8). The drying chamber is provided with a heat exchanger, or inlet for superheated steam and a condenser connected to an outlet for recycling condensate collected from the condenser to the storage tank. Gases from the condenser are routed through an air purifier.

The bamboo pieces may be impregnated (7) by any conventional technique including: application of pressure up to 15 atmospheres; vacuum followed by pressure; or by application of atmospheric or low pressure followed by higher pressure and a final vacuum step.

The impregnating solution may comprise one or more furan resin prepolymers including for example monomers selected from furfuryl alcohol, bis hydroxymethyl furan, tris hydroxymethyl furan or oligomers of these compounds.

Mixtures of monomers or of monomers and oligomers may be used, provided that they are sufficiently fluid to penetrate and impregnate the bamboo.

A general method which may be used includes the steps of securing the bamboo pieces in a cage so that they will not float; closing the autoclave and applying a partial vacuum; filling the autoclave with the treating mixture while maintaining the vacuum to submerge the bamboo; pressurising the autoclave to a pressure in the range of 5-14 atmospheres dependent on the dimensions of the bamboo or bamboo articles and desired rate of impregnation; reducing the pressure to 2 or 3 atmospheres and expelling the liquid using the remaining pressure within the autoclave. Finally, the pressure is released and the treated bamboo is removed.

A typical treatment solution may comprise:

| | |
|---|---|
| furfuryl alcohol | 22.5% |
| maleic anhydride | 0.5% |
| citric acid | 1.0% |
| ethanol | 71.0% |
| water | 5.0%. |

A liquid uptake of up to 70 or 80% in relation to dry bamboo mass may be achieved. This was surprising in view of the difficulty of impregnation of bamboo.

Alternative impregnating solutions are disclosed in WO2004/011216 and WO2004/011214 the disclosures of which are incorporated into this specification by reference for all purposes.

When the impregnated bamboo pieces have been placed (9) within the drying chamber, a pre-vacuum is applied for a short period to remove any air from the chamber in order to prevent a risk of fire or explosion. The pressure during the pre-vacuum period may be up to 0.3 bar due to evaporation of water from the impregnated bamboo.

The container is then heated to a temperature of about 70° C. over a period of 3-6 hours. During this heating up period the pressure may rise from the pre-vacuum pressure of less than 0.2 bar to between about 0.2 and about 0.4 bar, preferably about 0.3 bar.

The relative humidity may be about 90%.

The conditions within the container are maintained by control of pressure, injection of superheated steam and external heating.

The moisture content of the bamboo is determined by measurement of the amount of water collected from the container. The drying stage may be complete when the moisture content of the bamboo is about 15% or lower.

After the drying stage is complete the pressure is allowed to rise (10) to about 1 bar and the temperature is increased to from about 100 to about 140° C. preferably, about 100° C. with the relative humidity increasing from about 60 to about 80% by addition of superheated steam to the container, in order to prevent cracking or deformation of the bamboo.

The curing conditions may be maintained for about 10 hours dependent on the nature of the polymer composition and the thickness of the bamboo or bamboo articles.

When the curing is complete the polymer impregnated bamboo pieces or bamboo articles are removed from the container (11).

The pieces of impregnated bamboo are bonded together using adhesives to form composite structures, for example, decking or flooring.

The pieces are placed in a mold (12) and uncured adhesive composition is added. A vacuum may be used to assist penetration by the adhesive between the pieces. The adhesive is then cured (13) using heat and pressure as required to form a cured composite article. The article is then removed from the mold (14) and finished by cutting to size and machining as necessary.

FIG. 2 shows a cross-sectional view of an engineering component comprising a polymer impregnated bamboo in accordance with this invention. The engineering component may comprise a floorboard, wall panel or other constructional component, for example used for making buildings. An array of strips of polymer impregnated bamboo (20) are arranged side by side and are bonded together by layers of curable adhesive (21) to form a solid laminate structure. A layer of adhesive (22) extends beyond the ends of the impregnated strips (20) to form an upper surface (25) of the component. The upper surface (25) may be provided with a non-slip or wear-resistant coating, for example by bonding aggregate particles into the upper surface. Alternatively, the surface (25) may be polished to provide a decorative appearance. At the sides of the component (27) the impregnated bamboo pieces (24) are cut with cured adhesive (23) provided to form perpendicular edges so that the component may be fitted to an adjacent similar component. Lower surface (26) may be coated with bitumen or other heat softenable adhesive to facilitate application to floor or other underlying surfaces.

Polymer treated bamboo manufactured in accordance with this invention was tested for decay resistance.

The treated materials included in the test were supplied by Kebony ASA.

a) Furfuryl alcohol resin treated bamboo
   1) Solid Bamboo
   2) Brittle samples where the fibres were falling apart
b) Furfuryl alcohol resin thermally treated bamboo
   1) Solid Bamboo
   2) Brittle samples where the fibres were falling apart.

Test Fungi
*Postia placenta* (Fr.) M. J. Larsen & Lombard, strain FPRL 280
*Trametes versicolor* (L.) Lloyd, strain CTB 863 A
*Gloeophyllum trabeum* BAM Ebw. 109

Preparation of Test Specimens
The samples were sawn into the size, 10×5×25 mm (Bravery 1979). Control samples were prepared from untreated *P. sylvestris* sapwood.

Accelerated Ageing (Water Leaching) According to EN 84
The specimens were leached according to EN 84. Each material was leached separately. The specimens were vacuum-impregnated with de-ionised water and placed in water flasks. The water volume in relation to specimen volume was 5:1. Ten exchanges of water were made during a 14-day period. The specimens were oven-dried and weighed.

Decay Testing According to the Miniblock Test (Bravery 1979)
The test specimens were sterilized by autoclaving. Each sample was put on a plastic-net in a petri-dish together with one untreated *P.Sylvestris* control. For each treatment 6 replicates were used. There were 6 replicates×3 fungi=18 samples per treatment. For 2 treatments, there were 36 treated samples and 36 untreated samples. There were 6 correction values per treatment and 6 virulence samples per fungi.

Inoculation with Fungal Mycelium
One inoculum overgrown with mycelium of respective test fungus was placed in each petri-dish. The petri-dishes were placed in a culture room (22 C, 85% RH).

Test Duration and Termination
The test was run for 9 weeks (1 week for the inoculum to start growing and 8 weeks for the test). The wood specimens were wiped clean from fungal mycelium, weighed, oven-dried (18 h at 103 C) and weighed again. Mass loss due to decay was calculated.

Results
Calculation of Correction Values (from Specimens in Non-Inoculated Petri-Dishes)
The mass loss values were corrected for the leaching to agar. Therefore correction values were calculated (Table 1). These correction values for each group of samples are obtained by placing them in sterile petri-dishes under the same conditions and time as those who have been inoculated with fungal mycelium.

TABLE 1

Correction values for the different treatments and untreated

| Treatment | Correction values Mass loss (%) |
| --- | --- |
| Furfuryl alcohol impregnated Bamboo | 0.2 |
| Untreated *P. Sylvestris* sapwood | 0.3 |
| Furfuryl alcohol impregnated treated Bamboo | 0.2 |
| Untreated *P. Sylvestris* sapwood | 0.2 |

Test Fungus: *Trametes versicolor*
Virulence Samples for *Trametes versicolor*
The mass loss for unmodified *pinus sylvestris* sapwood as virulence control and of the control lying next to each sample was after 8 weeks above 13.8% (See Table 2).

Test samples for *Trametes versicolor*
The treated bamboo had a mass loss of 2.4% and the Furfuryl alcohol polymer impregnated heat treated bamboo had a mass loss of 1.5% (see Table 2).

TABLE 2

Mass loss for the different treatments and the untreated control.

| | Corrected mass loss (%) | | |
| --- | --- | --- | --- |
| Treatment | Postia placenta | Tramets versicolor | Gloeophyllum trabeum |
| Furfuryl alcohol impregnated Bamboo | 0.7 | 2.4 | 2.5 |
| Untreated *P. Sylvestris* sapwood | 28.8 | 13.9 | 18.7 |
| Furfuryl alcohol impregnated heat treated bamboo | 0.4 | 1.5 | 1.7 |
| Untreated *P. Sylvestris* sapwood | 28.8 | 13.8 | 20.6 |
| Virulens *P. Sylvestris* sapwood | 21.9 | 15.8 | 20.6 |

Test Fungus: *Gloeophyllum trabeum*
Virulence Samples for *Gloeophyllum trabeum*
Mass loss for unmodified *pinus sylvestris* controls sapwood as virulence control and of the control lying next to each sample was after 8 weeks over 18.7% (see Table 2).

Test Samples for *Gloeophyllum trabeum*

The furfuryl alcohol polymer treated bamboo had a mass loss of 2.5% and the furfuryl alcohol polymer heat treated bamboo had a mass loss of 1.7% (See Table 2).

Test Fungus: *Postia placenta*

Virulence Samples for *Postia placenta*

Mass loss for unmodified *Postia placenta* controls sapwood as virulence control and of the control lying next to each sample was after 8 weeks over 20% (See Table 2).

Test Samples for *Postia placenta*

The furfuryl alcohol polymer treated bamboo had a mass loss of 0.7% and the furfuryl alcohol polymer heat treated bamboo had a mass loss of 0.4% (See Table 2).

The invention claimed is:

1. An engineering or constructional member comprising at least two strips bonded together with an adhesive; wherein each of the strips comprises bamboo impregnated with a polymer derived from one or more furfuryl alcohol resin precursors, dried and cured at a temperature between 50 and 180 degrees Celsius which provides protection against degradation by microorganisms, splintering and delamination; and wherein the bonded bamboo impregnated with the polymer are not carbonized or pyrolysed and are of a dark brown bamboo color.

2. An engineering or constructional member as claimed in claim 1 wherein the furfuryl alcohol resin precursors are selected from polymerisable monomers or oligomers selected from the group consisting of furfuryl alcohol (FA), bishydroxymethyl furan (BHMF), trihydroxymethyl furan (THMF), oligomers of FA, BHMF and THMF condensation products of these compounds and mixtures thereof.

3. An engineering or constructional member as claimed in claim 1 wherein the furfuryl alcohol resin precursors are selected from the group consisting of: furfuryl alcohol, bishydroxymethyl furan and oligomers and condensation products thereof.

4. An engineering or constructional member as claimed in claim 1 bonded with an adhesive selected from the group consisting of: epoxy resins, urea-formaldehyde resins, melamine-formaldehyde resins, methylene diphenyl isocyanate or polyurethane resins or other moisture resistant adhesives.

5. An engineering or constructional member as claimed in claim 4 comprising a panel, board, decking, cladding, marine component, marine article, flooring, floor tile, constructional component, furniture or sporting equipment.

6. An engineering or constructional member as claimed in claim 1 which is more resistant to attack by an insect, termite or other pest than a component made from untreated bamboo.

7. An engineering or constructional member as claimed in claim 1, wherein the bamboo and impregnated polymer have been subjected to a maximum temperature of 180 degrees Celsius.

8. A method of manufacture of polymer impregnated bamboo as claimed in claim 1 comprising the steps of impregnating the bamboo with a polymerisable composition comprising:
   (i) one or more furan resin polymerisable monomers, or oligomers;
   (ii) a catalyst;
   (iii) a solvent selected from the group consisting of: water, acetone, $C_1$-$C_4$ alcohols and mixtures thereof; wherein the one or more wood compatible polymerises or monomers or oligomers has a boiling point not less than 50° C. higher than the boiling point of the solvent and atmospheric pressure; and
   (iv) optionally one or more stabilisers or other ingredients;
   to produce impregnated bamboo;
   subjecting the impregnated bamboo or bamboo article to a water removal process; and
   maintaining the bamboo at a higher temperature to form the polymeric material to produce polymer treated bamboo.

9. An apparatus for manufacture of an engineering or constructional member as claimed in claim 1 by polymer impregnation of bamboo comprising:
   a container adapted to receive pieces of bamboo or one or more bamboo articles to be treated, the container having a pump for applying reduced pressure to the container;
   a steam generator adapted to supply superheated steam to the chamber; and
   sensors adapted to monitor parameters selected from pressure, temperature, humidity and concentration of volatile organic compounds within the container.

10. An apparatus as claimed in claim 9, further comprising a carrier moveable into and out of the container, in use the carrier comprising a cage arranged to receive and retain pieces of bamboo, and a carriage on which the cage is mounted.

11. An apparatus as claimed in claim 9, wherein an inlet for superheated steam is provided.

12. An apparatus as claimed in claim 9, wherein a heat exchanger within the vessel is provided for direct heating.

* * * * *